(12) United States Patent
Camble et al.

(10) Patent No.: US 7,472,245 B2
(45) Date of Patent: Dec. 30, 2008

(54) SYSTEM AND METHOD FOR SECURING DRIVE ACCESS TO DATA STORAGE MEDIA BASED ON MEDIUM IDENTIFIERS

(75) Inventors: Peter Thomas Camble, Bristol (GB); Stephen Gold, Bristol (GB); Ian Peter Crighton, Bristol (GB); Curtis C. Ballard, Eaton, CO (US); Chuck Roman, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 11/323,545

(22) Filed: Dec. 30, 2005

(65) Prior Publication Data

US 2006/0168652 A1  Jul. 27, 2006

(51) Int. Cl.
*G06F 12/00* (2006.01)
(52) U.S. Cl. ....................................... 711/163
(58) Field of Classification Search ........................ None
See application file for complete search history.

(56) References Cited

U.S. PATENT DOCUMENTS

| | | |
|---|---|---|
| 5,070,404 A | 12/1991 | Bullock et al. |
| 5,164,909 A | 11/1992 | Leonhardt et al. |
| 5,303,214 A | 4/1994 | Kulakowski et al. |
| 5,367,669 A | 11/1994 | Holland et al. |
| 5,416,914 A | 5/1995 | Korngiebel et al. |
| 5,442,771 A | 8/1995 | Filepp et al. |
| 5,455,409 A | 10/1995 | Smith et al. |
| 5,613,154 A | 3/1997 | Burke et al. |
| 5,734,859 A | 3/1998 | Yorimitsu et al. |
| 5,802,278 A | 9/1998 | Isfeld et al. |
| 5,805,864 A | 9/1998 | Carlson et al. |
| 5,819,309 A | 10/1998 | Gray |
| 5,835,940 A | 11/1998 | Yorimitsu et al. |
| 5,867,335 A | 2/1999 | Ozue et al. |
| 5,867,736 A | 2/1999 | Jantz |
| 5,883,864 A | 3/1999 | Saliba |
| 5,890,014 A | 3/1999 | Long |
| 5,943,688 A | 8/1999 | Fisher et al. |
| 5,970,030 A | 10/1999 | Dimitri et al. |
| 6,038,490 A | 3/2000 | Dimitri et al. |
| 6,044,442 A | 3/2000 | Jesionowski |

(Continued)

FOREIGN PATENT DOCUMENTS

EP      0859308      8/1998

(Continued)

OTHER PUBLICATIONS

"Sharing Backup Resources," Ralph Cuellar; Apr. 2000.

(Continued)

*Primary Examiner*—Hiep T Nguyen

(57) ABSTRACT

A method for securing access to a data medium comprises listing at least one unique identifier of media that a data transfer element is allowed to access in memory storage of the data transfer element, accessing only media having at least one of the listed unique identifiers in media cartridge memory with the data transfer element, and writing a unique identifier associated with the data transfer element to the cartridge memory of the selected medium with the data transfer element in response to no library assigned unique identifier being present in the cartridge memory of the selected medium.

19 Claims, 4 Drawing Sheets

U.S. PATENT DOCUMENTS

| | | | |
|---|---|---|---|
| 6,052,341 | A | 4/2000 | Bingham et al. |
| 6,084,736 | A | 7/2000 | Kurokawa et al. |
| 6,085,123 | A | 7/2000 | Baca et al. |
| 6,247,096 | B1 | 6/2001 | Fisher et al. |
| 6,295,578 | B1 | 9/2001 | Dimitri et al. |
| 6,335,927 | B1 | 1/2002 | Elliot et al. |
| 6,336,163 | B1 | 1/2002 | Brewer et al. |
| 6,336,172 | B1 | 1/2002 | Day et al. |
| 6,421,196 | B1 | 7/2002 | Takayama et al. |
| 6,421,711 | B1 | 7/2002 | Blumenau et al. |
| 6,425,059 | B1 | 7/2002 | Basham et al. |
| 6,446,141 | B1 | 9/2002 | Nolan et al. |
| 6,502,162 | B2 | 12/2002 | Blumenau et al. |
| 6,507,896 | B2 | 1/2003 | Sanada et al. |
| 6,519,678 | B1 | 2/2003 | Basham et al. |
| 6,535,964 | B2 | 3/2003 | Sanada et al. |
| 6,574,667 | B1 | 6/2003 | Blumenau et al. |
| 6,606,664 | B2 | 8/2003 | Darago et al. |
| 6,618,796 | B2 | 9/2003 | Yamakawa et al. |
| 6,636,958 | B2 | 10/2003 | Abboud et al. |
| 6,681,303 | B1 | 1/2004 | Watanabe et al. |
| 6,725,394 | B1 | 4/2004 | Bolt |
| 6,731,625 | B1 | 5/2004 | Eastep et al. |
| 6,742,034 | B1 | 5/2004 | Schubert et al. |
| 6,799,255 | B1 | 9/2004 | Blumenau et al. |
| 6,813,698 | B2 | 11/2004 | Gallo et al. |
| 6,823,398 | B1 | 11/2004 | Lee et al. |
| 6,832,287 | B2 | 12/2004 | Beeston et al. |
| 6,842,784 | B1 | 1/2005 | Black |
| 6,850,380 | B2 | 2/2005 | Basham et al. |
| 2001/0044877 | A1 | 11/2001 | Kanazawa et al. |
| 2002/0194294 | A1 | 12/2002 | Blumenau et al. |

FOREIGN PATENT DOCUMENTS

| | | |
|---|---|---|
| EP | 0978841 | 2/2000 |
| EP | 1039410 | 9/2000 |
| EP | 1156408 | 11/2001 |
| JP | 09185465 | 7/1997 |
| JP | 10269026 | 10/1998 |
| JP | 2001014257 | 1/2001 |
| JP | 2002304791 | 10/2002 |

OTHER PUBLICATIONS

"The Gator Tape Library Family Architecture," John Krana; Oct. 1999.

"Fibre Channel Fundamentals," Tom Weimer.

Foreign Search Report dated Feb. 13, 2003.

IBM Technical Disclosure Bulletin, "Optical Disk Drive Loader for Work Station with Pluggable Magazine", vol. 38, No. 12, Dec. 1955, pp. 243-246.

Massiglia, P., "The Raid Book", 6th Edition, Feb. 1997, 83 pages.

IBM Technical Disclosure Bulletin, "Logical Grouping of Data Storage Media in a Library System", vol. 35, No. 5, Oct. 1992—pp. 17-20.

European Search Report issued for EP 02 25 8806, dated Jan. 4, 2005.

"Spectra 12000 User Guide," Sep. 2000.

SYSTEM AND METHOD FOR SECURING DRIVE ACCESS TO DATA STORAGE MEDIA BASED ON MEDIUM IDENTIFIERS

RELATED APPLICATIONS

The present invention is related to the following and commonly assigned U.S. patent applications: Ser. No. 10/034,691 issued as U.S. Pat. No. 6,715,031 entitled System and Method for Partitioning a Storage Area Network Associated Data Library, filed Dec. 28, 2001 and issued Mar. 30, 2004; Ser. No. 10/033,009 issued as U.S. Pat. No. 6,839,824 entitled System and Method for Partitioning a Storage Area Network Associated Data Library Employing Element Addresses, filed Dec. 28, 2001 and issued Jan. 4, 2005; Ser. No. 10/032,662 issued as U.S. Pat. No. 7,062,614 entitled System and Method for Managing Access To Multiple Devices in a Partitioned Data Library, filed Dec. 28, 2001 and issued Jun. 13, 2006; Ser. No. 10/032,923 and published as U.S. Patent Application Publication No. 2003/0126225 entitled System and Method for Peripheral Device Virtual Functionality Overlay, filed Dec. 28, 2001 and published Jul. 3, 2003; Ser. No. 10/034,518 issued as U.S. Pat. No. 7,363,425 entitled System and Method for Securing Drive Access to Media Based On Medium Identification Numbers, filed Dec. 28, 2001 and issued Apr. 22, 2008; Ser. No. 10/033,010 and issued as U.S. Pat. No. 6,999,999 entitled System and Method for Securing Fiber Channel Drive Access in a Partitioned Data Library, filed Dec. 28, 2001 and issued Feb. 14, 2006; Ser. No. 10/033,003 entitled Method for Using Partitioning to Provide Capacity on Demand in Data Libraries, filed Dec. 28, 2001; Ser. No. 10/034,580 and issued as U.S. Pat. No. 6,845,431 entitled System and Method for Intermediating Communication with a Moveable Media Library Utilizing a Plurality of Partitions, filed Dec. 28, 2001 and issued Jan. 18, 2005; and Ser. No. 10/034,083 and issued as U.S. Pat. No. 7,082,497, entitled System and Method for Managing a Moveable Media Library with Library Partitions, filed Dec. 28, 2001 and issued Jul. 25, 2006; the disclosures of which are hereby incorporated herein by reference.

TECHNICAL FIELD

The present invention generally relates to data storage and specifically to systems and methods for securing drive access to media based on medium identifiers.

BACKGROUND

One of the most attractive aspects of a storage area network (SAN) is that network connectivity enables a company to efficiently use storage by sharing storage capacity among a number of servers. This may be implemented using a large number of small capacity storage devices. However, unless sufficiently robust management software is employed, such use of small capacity devices in a SAN may result in significant management overhead. Most users prefer to install large capacity storage devices and partition the device(s), assigning each partition to a different server. For example, existing firmware for enterprise level disk arrays allow users to define multiple redundant arrays of independent disks (RAID), where each RAID set appears as a different logical unit number (LUN). Each one of these LUNs may be dedicated to a different server.

In certain SAN usage scenarios, such as may arise for storage service providers (SSPs), there are multiple customers attempting to share common SAN resources. In such cases, there is a need to ensure that customers can only see and access the storage resources they have been allocated and prevent them from accessing storage of other customers. For example, if a customer stores their critical business data with a SSP, then they generally do not want other customers of the SSP reading their data or even being aware that the customer has information stored with the SSP. To isolate user data in a data library the library may be partitioned. However, special hardware or special backup software as described below has been used to implement partitioning.

Existing software-based data library partitioning solutions typically employ a host system that restricts access to portions of a tape library. The host restrictions are implemented by a mediating (software) process on a host system to enforce partition restrictions. However, this approach is problematic. Specifically, the approach is undesirable if the data library is utilized in a SSP environment. In SSP environments, the data library and the host systems belong to different entities (e.g., the SSP and the customers). Placement of software mediating processes on host systems is unattractive, because it increases the burden on the customers to make use of the storage service. Moreover, many customers are unwilling to allow other parties to place software on their host systems. Additionally, the software mediating process approach is typically incompatible with existing data back-up utilities, i.e., the software mediating process approach requires the use of specialized data back-up applications. Hence, users are effectively denied the ability to run desired backup software.

An additional problem may arise in that a library operator may accidentally place a medium in an incorrect storage slot within a partitioned data library or in an entirely incorrect data library within an SSP's facility. This may allow this misplaced medium to be read by an SSP customer or user other than the owner of the information on the misplaced medium.

The use of memory in a tape cartridge, generally referred to as cartridge memory (CM), is known in the art. Existing cartridges and drives store information in the CM such as how many times a tape has been loaded, a cassette serial number, what was last written on the tape, what block was last written to on the tape and/or the tape error rate. Conventionally this information facilitates setting up the tape when it is inserted back into a drive. For example, each time a tape cartridge with CM is inserted into a drive the CM is read during initialization of the drive. During the drive initialization sequence, the drive reads the memory, diagnoses the tape, recognizes the tape format and where writing should begin. Additionally, information in the memory about error rate and/or number of loads can help diagnose failing tapes. Such CM may also be referred to as memory in cartridge (MIC).

SUMMARY OF THE INVENTION

A method for securing access to a data medium comprises listing at least one unique identifier of media that a data transfer element is allowed to access in memory storage of the data transfer element, accessing only media having at least one of the listed unique identifiers in media cartridge memory with the data transfer element, and writing a unique identifier associated with the data transfer element to the cartridge memory of the selected medium with the data transfer element in response to no library assigned unique identifier being present in the cartridge memory of the selected medium.

A method embodiment for securing access to data media in a particular partition of a partitioned data library comprises listing at least one unique identifier of media that data transfer elements in the partition are allowed to access in memory storage of the data transfer elements in the partition, reading a unique identifier from cartridge memory of a selected medium with a data transfer element receiving the selected medium, checking the memory storage of the data transfer element receiving the selected medium for the unique identifier of the selected medium, and accessing the selected medium in response to the unique identifier of the selected medium being present in the memory storage of the data transfer element receiving the selected medium.

An embodiment of a partitioned data library in accordance with a preferred embodiment of the present invention comprises data storage media, each medium of the media having cartridge memory, a plurality of storage element slots, each of the slots adapted to store one medium of the data storage media, at least one set of at least one of the slots assigned to one partition of a plurality of library partitions, a plurality of data transfer elements that are adapted to receive the media, read the medium cartridge memory and transfer data to and from the media, each of at least one set of at least one of the data transfer elements assigned to one of the library partitions, and wherein the cartridge memory of a selected medium is read by one of the data transfer elements receiving the selected medium and access to the media by the data transfer elements is restricted to selected media having at least one particular unique identifier stored in the medium cartridge memory.

DETAILED DESCRIPTION

The present invention is directed to systems and methods that provide medium access security based on a unique identifier written to a medium cartridge memory (CM). Preferably, the unique identifier is written to CM by a drive and is read by a drive. The present system and method moves ultimate responsibility for limiting access to certain media in a partitioned data library to the drives, providing a failsafe for a library partitioning system.

Figure 1:
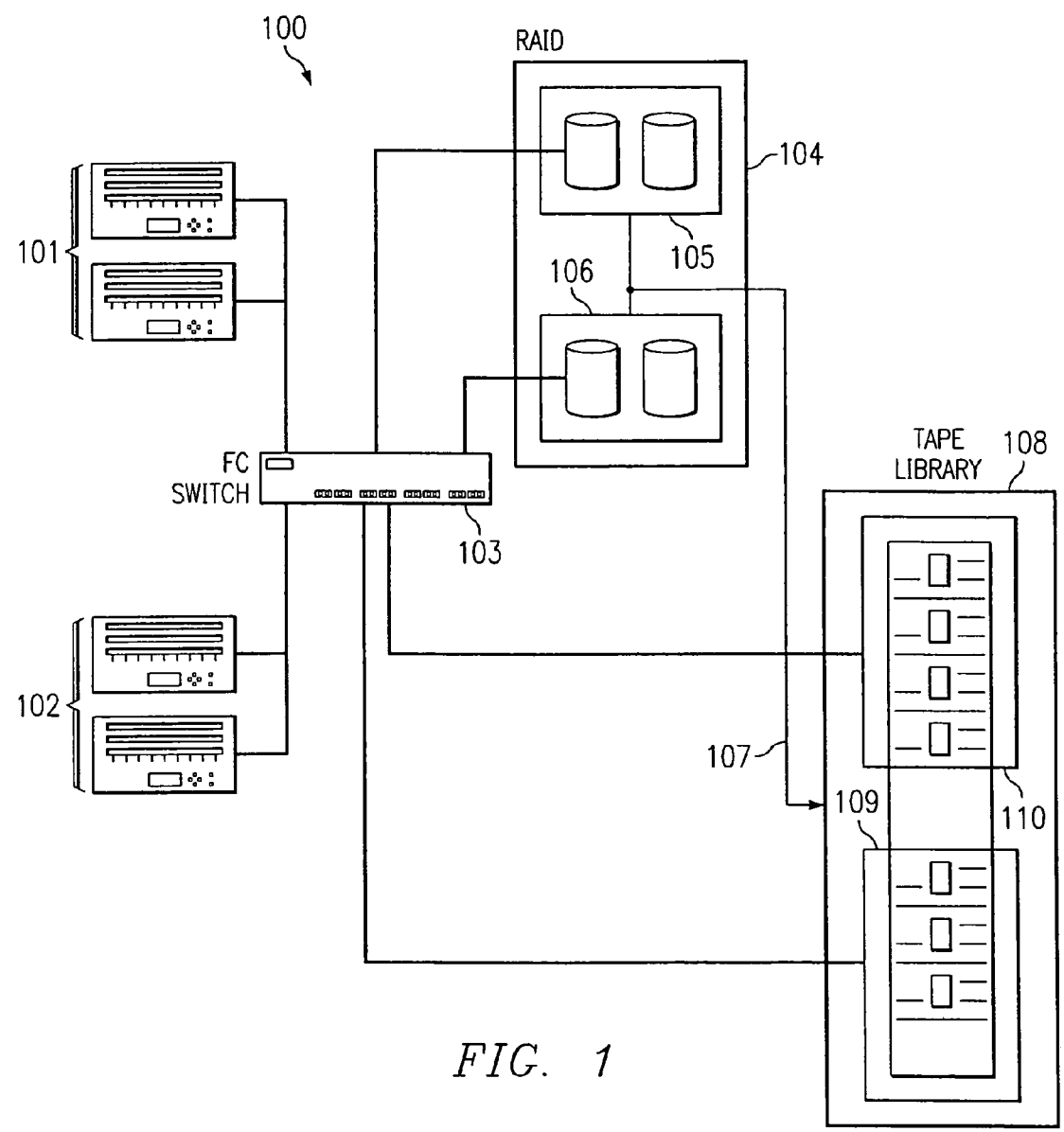
FIG. 1 is a diagrammatic illustration of a SAN operating consistent with the teachings of the present invention.

Turning to FIG. 1, SAN 100 is shown. By way of example, first and second customer servers 101 and 102 are connected to SAN 100 via FC switch 103. RAID 104 may be partitioned, assigning first partition 105 to server 101 and second partition 106 to server 102 using existing LUN-based RAID partitioning methods. Zero downtime backups (ZDBs) may be performed of the data each server has on the RAID to data library 108, via ZDB interconnectivity 107 between RAID 104 and data library 108. Such ZDBs preferably employ data-mover firmware embodied in RAID 104 or other elements of SAN 100. ZDBs are preferably carried out without impinging on the processor operations or LAN capacity of servers 101 and 102. Data library 108 may be partitioned in such a manner as to insure that data for server 101 is maintained in partition 109 separate from data for server 102, and that the data of server 102 is maintained in partition 110 separate from data for server 101. Such partitioning facilitates restricting access such that the servers may not access each other's data even though both servers' data is maintained in the same physical library.

A SAN attached data library may be logically partitioned into many smaller libraries without the use of special hardware or software. Each of the drives in the library may be designated for use by a different host system that has free access to the library robotics controller as well as to the designated drives. Such a system and method is disclosed in copending U.S. patent application Ser. No. 10/034,691 issued as U.S. Pat. No. 6,715,031 entitled "System and Method for Partitioning a Storage Area Network Associated Data Library" filed Dec. 28, 2001 and issued Mar. 30, 2004. A set of drives and medium storage slots of the library are assigned to each partition. The movement of media is restricted to and from slots and drives within a partition. The drives in the library are preferably assigned a limited range of media that each drive may access for read/write functions.

Figure 2:
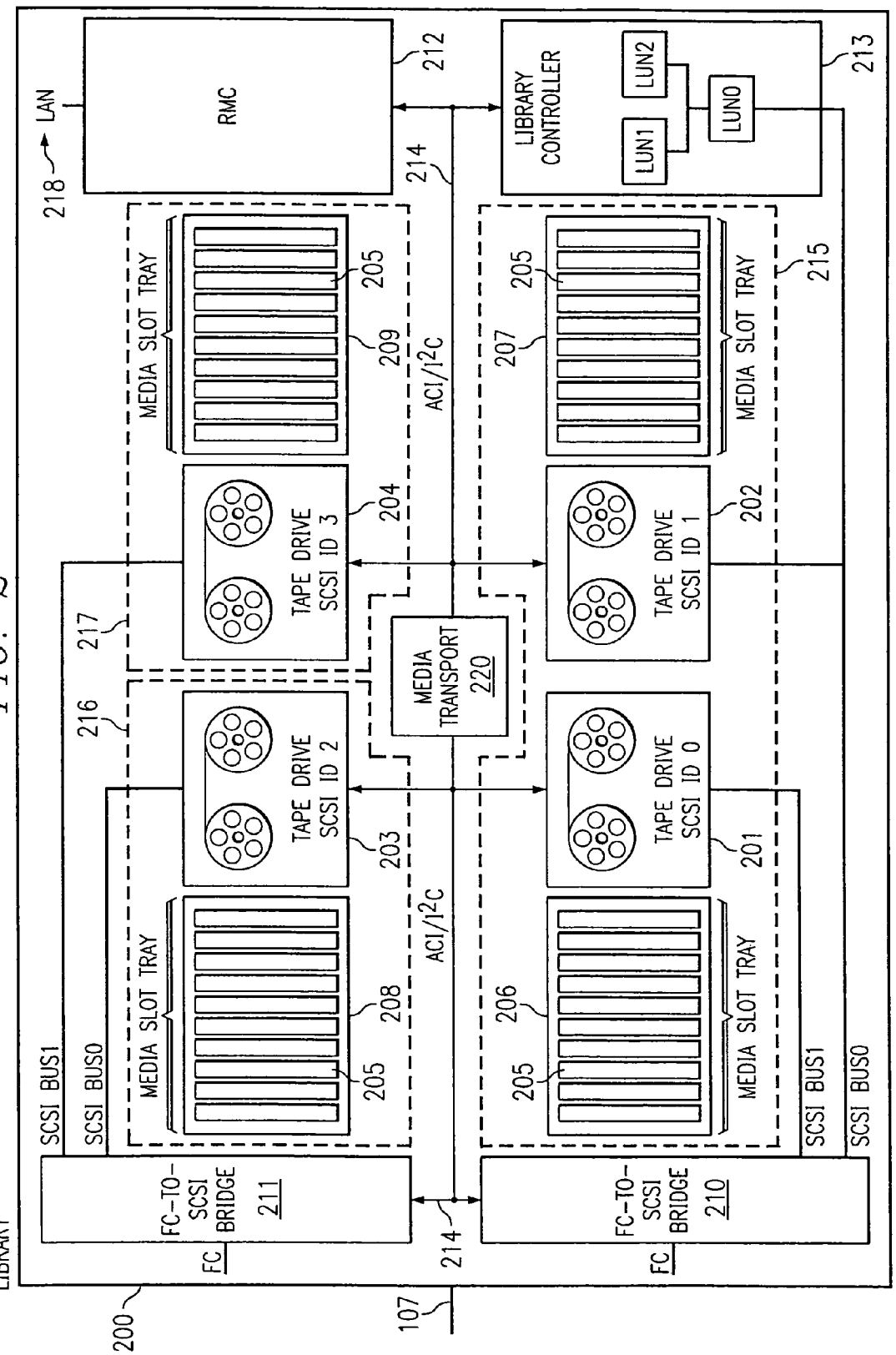
FIG. 2 is a diagrammatic illustration of an example of a data library employing a preferred embodiment of the present invention.

Data tape library 200 employing a preferred embodiment of the present system and method is illustrated in FIG. 2 as an example of a library that may be employed as library 108 of FIG. 1. However, other library designs and/or capacities may embody the present system and method. Exemplar data tape library 200 has four CM-enabled drives or data transfer elements 201-204; forty media storage element slots 205 organized into four trays 206-209 of ten slots 205 each; two FC-to-SCSI bridges 210 and 211; a library management interface card or remote management card (RMC) 212; and library controller 213. Drives 201-204, FC-to-SCSI bridges 210 and 211, RMC 212 and library controller 213 preferably communicate with each other using an inter-integrated circuit ($I^2C$) bus, illustrated here as automated control interface (ACI) 214, or the like.

For partitions that may employ the present system and method, library, drives 201-204 should be assigned to each partition. Drives 201-204 are preferably enabled to read CM, thereby allowing a drive to read a unique identifier residing in CM of a medium disposed in the drive. Additionally, media slots 205 may also be assigned to each partition to house the media assigned to the partition. A virtual library controller should be addressable with respect to each partition to control movement of media between the slots and drives by library robotics 220. The example partitioning shown in FIG. 2 is indicated by boxes 215, 216 and 217. As illustrated, LUN0 corresponds to partition 215, LUN1 corresponds to partition 216 and LUN2 corresponds to partition 217. Finally, import/export elements or mailslots may be assigned to each partition or configured for use by the entire physical library. Preferably, easily-accessible media storage slots may be configured as mailslots by the present invention.

CM-enabled tape drives 201 through 204 may be configured out-of-band, via ACI 214 so that the drives will write a specified, relatively unique, identifier to tape CM the first time a tape is inserted into the drive. This unique identifier in the CM preferably identifies the media as having been written to by a drive or the set of drives in a virtual library partition. All drives in a partition may employ the same unique identifier; in turn, the media in the partition would have the same unique identifier residing in CM. The identifier may only be unique within the library itself, such as to provide differentiation between media of partitions of the library. Thus, it should be appreciated that the unique identifier might not differentiate media between partitions of different physical libraries. Preferably, the unique identifier is unique to a degree sufficient to differentiate media within a physical entity, such as a SAN or within an SSP's resources and would provide an indication as to the physical library, partition and/ or drive to which a medium belonged. Alternatively, a unique identifier may be universally unique.

Preferably, no special initialization or inventory sequence is required to setup security employing the present system and method beyond configuring a drive to only accept media which have the aforementioned unique identifier(s) in their CM. This drive setup may be performed via an RMC user interface. The RMC and/or controller may direct a drive to only allow access to media having a particular identifier in CM. These directions are preferably conveyed via ACI 214 and stored in nonvolatile random access memory (NVRAM) associated with the drive in the form of a list of unique media identifiers the drive is allowed to access. Preferably, media with no identifier present in CM may also be accepted, at which point an identifier associated with the receiving drive and/or the drive's partition is preferably written to the CM of the medium. Thusly, a new medium introduced into a partition may be secured by the present inventive system and method.

Figure 3:
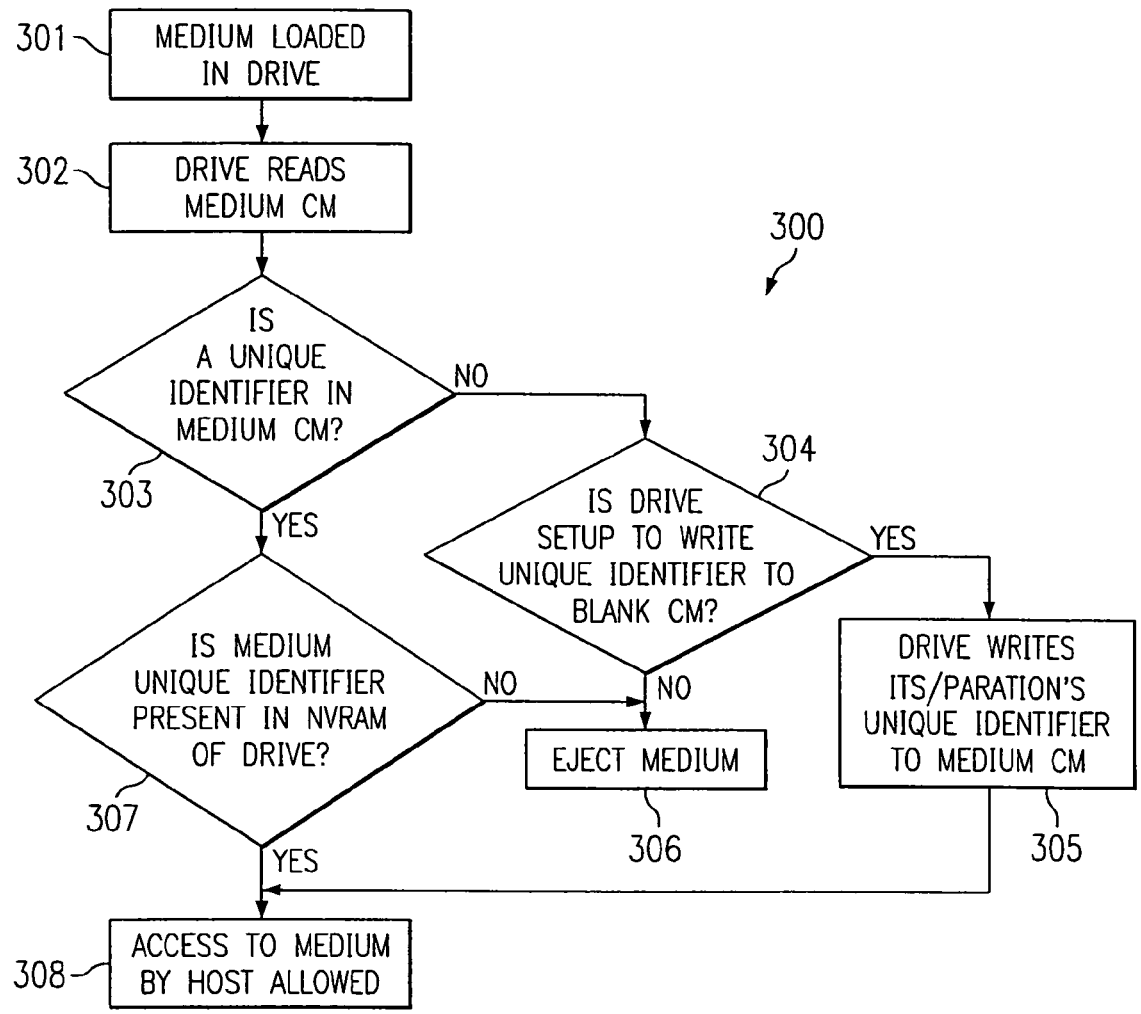
FIG. 3 is a flow chart of operation of a preferred method according to a preferred embodiment.

Turning to FIG. 3, a preferred embodiment of the present method 300 may be used to move responsibility for limiting access to certain media down to the drive and medium level. A medium may be loaded into a drive by the library at box 301. At box 302 the CM enabled drive reads the CM of the medium and confirms, at 303, the presence of a unique identifier in the CM. Preferably the unique identifier will identify the media as having been written to by that drive, or one of a set of drives in that drive's virtual library partition. If no library assigned unique identifier is present at 303 then the drive may write its unique identifier, which identifies the medium as belonging to the drive's partition, to the CM of the medium at box 305; and the medium is accessed at box 308. Preferably, if a medium has no identifier in CM the medium is blank, having never had data written to it. This insures that a medium can only be used in a particular partition from the time a unique identifier is written to the medium's CM, forward. If a unique identifier is present at step 303 then the drive firmware checks to see whether the unique identifier of the medium is present in the NVRAM of the drive at box 307. If at 307 the unique identifier is in the NVRAM, then the drive recognizes that medium as belonging to the same partition as the drive, and allows the connected host system to have unhindered read/write access to the medium at box 308. However, if the drive finds a unique identifier in the CM at 307 that identifies the medium as belonging to another partition or that the drive does not recognize, the drive will preferably immediately eject the medium at box 306 and thus denying the accessing host access to the medium.

Figure 4:
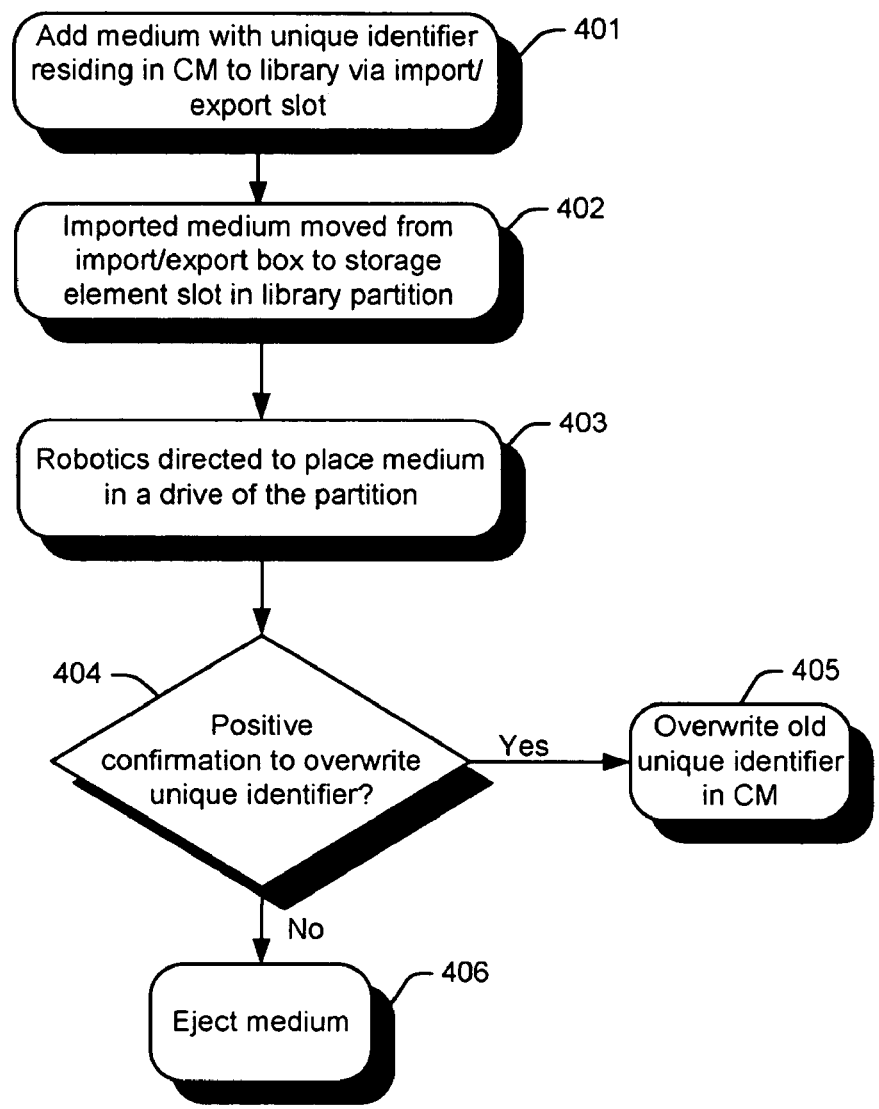
FIG. 4 is a flow chart of a preferred embodiment of an importation method of a medium in accordance with an embodiment of the present invention.

Turning to FIG. 4 method 400, in accordance with the present invention, is illustrated for replacing a unique identifier in a medium CM with another, different, unique identifier. Such a unique identifier swap-out may be desirable to facilitate movement of media from one physical library to another, such as may take place in a library upgrade. In such a swap-out, the partition the medium is placed in belongs to the same customer as the medium's original partition but the identifier in the new library is different due to the new library having a different set of physical drives. Additionally, "used" tapes introduced into a library will preferably have any unique identifier residing in CM replaced, in accordance with method 400. Method 400 is preferably preformed as part of an import procedure for the medium into the library and preformed out-of-band via the RMC and/or controller, with instructions to the drive(s)being issued over the ACI. At box 401 a medium with a unique identifier residing in CM is added to a library via an import/export slot. Preferably using a RMC user interface or the front panel of the library, the imported medium is moved, at box 402, from the import/export slot to a storage element slot in a library partition. In the case of a swap-out, the partition would preferably be one secured for use by a same customer as a partition from which the medium was exported in another library. Then, at box 403, the robotics of the library are directed, via the front panel or RMC interface, to place the medium in a drive of the partition. The old unique identifier in CM is overwritten at box 405 by the new drive with a unique identifier associated with the drive and/or the partition. Preferably at box 404, positive confirmation via the front panel or RMC interface is required to overwrite the unique identifier to insure partition integrity. If this positive confirmation is not provided at box 404 the medium is preferably ejected at box 406. Method 400 is preferably carried out manually, as a automatic process would allow one to defeat partition security.

Preferably, the drive firmware enforces access control, and preferably the firmware or NVRAM contents cannot be changed by the end user. So even if the user has unrestricted access to both the drives and library robotics at the command level, the user cannot defeat the access controls. Specifically, the identifier checking mode of a drive preferably may not be altered in band, such as by a SCSI command. Such an alteration is preferably only allowed to be carried out out-of-band, over the ACI. This out-of band alteration preferably may only be made over a LAN connected to the RMC, which in turn communicates over on an $I^2C$ to the library controller or via the library front panel. As indicated above, the controller communicates with the drives over an ACI. This isolation of control and security facilitates use of conventional, unmodified backup application software by a user rather than a software dictated by a SSP.

What is claimed is:

1. A data library configured to isolate data for different users, comprising:
   a plurality of physical partitions in a library;
   at least one drive assigned only to each of the plurality of physical partitions; and
   a reader on the at least one drive, the reader enabling the drive to read a unique identifier written to a medium cartridge memory (CM) of a medium disposed in the drive and only accept the medium if the unique identifier is assigned to the drive to restrict access to data such that different users cannot access each other's data even though data for the different users is maintained in the same physical library.

2. A data library of claim 1 wherein a new medium without a unique identifier present in the CM is accepted by the drive and the unique identifier associated with a partition of the drive is written to the CM to secure the new medium.

3. The data library of claim 1 wherein the unique identifier identifies a specific drive.

4. The data library of claim 1 wherein the unique identifier identifies a set of drives in a specific partition.

5. The data library of claim 1 wherein the unique identifier is relatively unique.

6. The data library of claim 5 wherein the relatively unique identifier is unique to a degree sufficient to differentiate media within a physical entity.

7. The data library of claim 5 wherein the relatively unique identifier provides an indication as to physical library, partition, and/or drive to which a medium belonged.

8. The data library of claim 1 wherein the unique identifier is universally unique.

9. The data library of claim 1 wherein no special initialization or inventory sequence is required to setup security beyond configuring a drive to only accept media which have the unique identifier in the CM.

10. A data library configured to isolate data for different hosts, comprising:

a plurality of logical partitions in a library;

at least one drive assigned only to each of the plurality of logical partitions, wherein the at least one drive is enabled to read and write a unique identifier on a medium cartridge memory (CM) of a medium disposed in the drive and only accept the medium if the unique identifier corresponds to the drive to restrict access to data such that different hosts cannot access each other's data even though data for the different hosts is maintained in the same physical library.

11. The data library of claim 10 wherein each of the drives in the library are designated for use by a different host system that has free access to library robotics controllers.

12. The data library of claim 10 wherein a new medium without a unique identifier present in the CM is accepted by the drive and the unique identifier associated with a partition of the drive is written to the CM to secure the new medium.

13. The data library of claim 10 wherein the unique identifier identifies a specific drive.

14. The data library of claim 10 wherein the unique identifier identifies a set of drives in a specific partition.

15. The data library of claim 10 wherein the unique identifier is relatively unique.

16. The data library of claim 15 wherein the relatively unique identifier is unique to a degree sufficient to differentiate media within a physical entity.

17. The data library of claim 15 wherein the relatively unique identifier provides an indication as to physical library, partition, and/or drive to which a medium belonged.

18. The data library of claim 10 wherein the unique identifier is universally unique.

19. The data library of claim 10 wherein no special initialization or inventory sequence is required to setup security beyond configuring a drive to only accept media which have the unique identifier in the CM.

* * * * *

UNITED STATES PATENT AND TRADEMARK OFFICE
CERTIFICATE OF CORRECTION

PATENT NO. : 7,472,245 B2 Page 1 of 1
APPLICATION NO. : 11/323545
DATED : December 30, 2008
INVENTOR(S) : Peter Thomas Camble et al.

It is certified that error appears in the above-identified patent and that said Letters Patent is hereby corrected as shown below:

In column 6, line 48, in Claim 2, delete "A" and insert -- The --, therefor.

Signed and Sealed this

Sixth Day of October, 2009

David J. Kappos
*Director of the United States Patent and Trademark Office*